US010807292B2

(12) United States Patent
McGee et al.

(10) Patent No.: US 10,807,292 B2
(45) Date of Patent: Oct. 20, 2020

(54) EXTRUSION DIE AND NOZZLE COOLING SYSTEM FOR LARGE SCALE 3D ADDITIVE MANUFACTURING

(71) Applicant: THE REGENTS OF THE UNIVERSITY OF MICHIGAN, Ann Arbor, MI (US)

(72) Inventors: Jonathan Wesley McGee, Ann Arbor, MI (US); Asa Leland Peller, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 421 days.

(21) Appl. No.: 15/792,286

(22) Filed: Oct. 24, 2017

(65) Prior Publication Data
US 2018/0117822 A1     May 3, 2018

Related U.S. Application Data

(60) Provisional application No. 62/411,844, filed on Oct. 24, 2016, provisional application No. 62/411,932, filed on Oct. 24, 2016.

(51) Int. Cl.
*B29C 48/30*     (2019.01)
*B29C 64/209*    (2017.01)
(Continued)

(52) U.S. Cl.
CPC .............. *B29C 48/30* (2019.02); *B21C 29/04* (2013.01); *B29C 48/885* (2019.02);
(Continued)

(58) Field of Classification Search
CPC ... B29C 48/0018; B29C 48/30; B29C 48/865; B29C 48/885; B29C 64/209; B29C 64/295; B29C 64/30; B33Y 30/00; B21C 29/04
See application file for complete search history.

(56) References Cited

U.S. PATENT DOCUMENTS 5,121,329 A  *  6/1992  Crump ................... B22F 3/115
                                                  700/119
2012/0080814 A1*  4/2012  Sun ......................... B29C 48/87
                                                  264/176.1
(Continued)

FOREIGN PATENT DOCUMENTS

WO    2015/034438 A1    3/2015
WO    2015/065936 A2    5/2015

*Primary Examiner* — Xiao S Zhao
*Assistant Examiner* — Joseph S Leyson
(74) *Attorney, Agent, or Firm* — Harness, Dickey & Pierce, P.L.C.

(57) ABSTRACT

An additive manufacturing (AM) extrusion die system having an extrusion die configured to receive a material to be extruded. The extrusion die includes a main body having a cylindrical section and a distal tapered section terminating at an extruder tip. The main body is configured to mount to a barrel of an additive manufacturing system. The die further includes a central extruder channel extending axially along the main body configured to receive the material at the cylindrical section of the main body and output the material at the extruder tip of the main body, and a cartridge heater slot formed within the main body and generally parallel to the central extruder channel. The cartridge heater slot configured to receive a cartridge heater therein for imparting thermal energy to the material within the central extruder channel. A cooling system is provided for controlling a temperature of the material.

18 Claims, 6 Drawing Sheets

(51) Int. Cl.
  *B29C 64/295* (2017.01)
  *B29C 64/30* (2017.01)
  *B29C 48/885* (2019.01)
  *B21C 29/04* (2006.01)
  *B33Y 30/00* (2015.01)

(52) U.S. Cl.
  CPC .......... *B29C 64/209* (2017.08); *B29C 64/295* (2017.08); *B29C 64/30* (2017.08); *B33Y 30/00* (2014.12)

(56) References Cited

U.S. PATENT DOCUMENTS

| | | |
|---|---|---|
| 2016/0001461 A1 | 1/2016 | Gardiner et al. |
| 2016/0263806 A1 | 9/2016 | Gardiner |
| 2016/0263822 A1* | 9/2016 | Boyd, IV ................ B32B 27/20 |

* cited by examiner

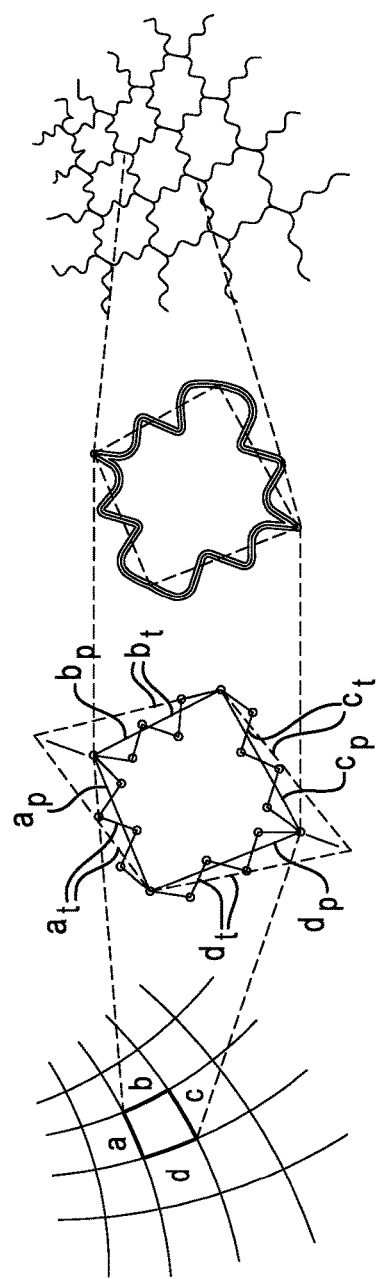
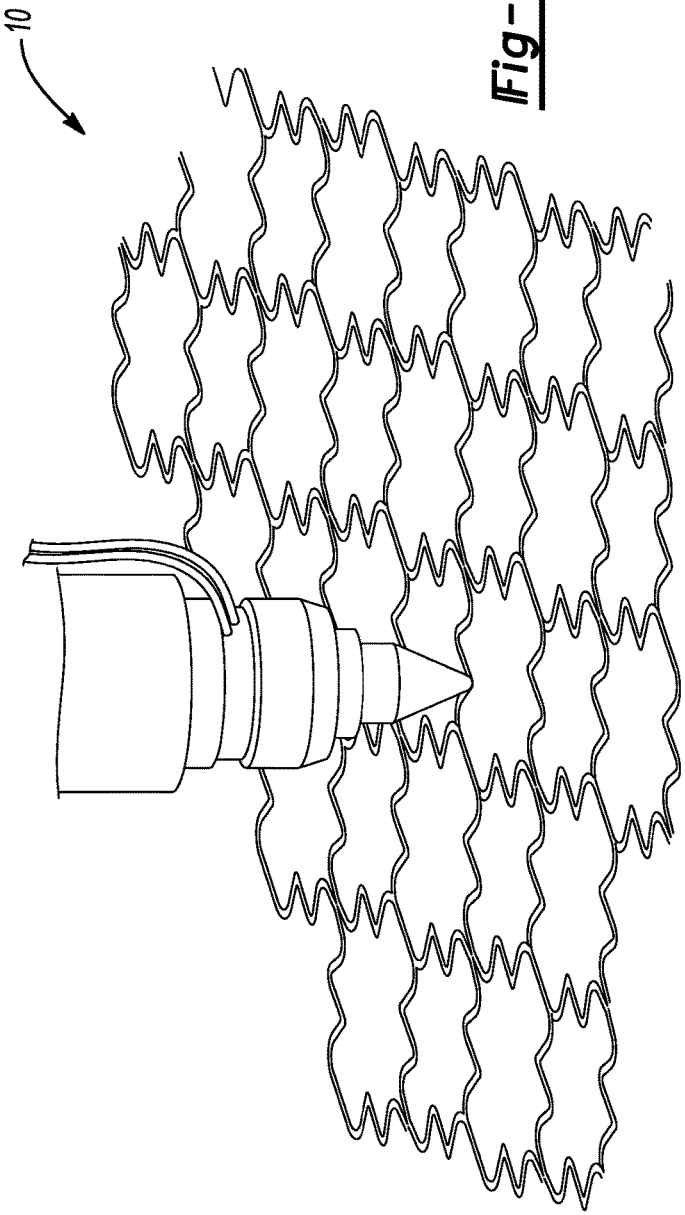
Fig-1A  Fig-1B  Fig-1C  Fig-1D  Fig-1E

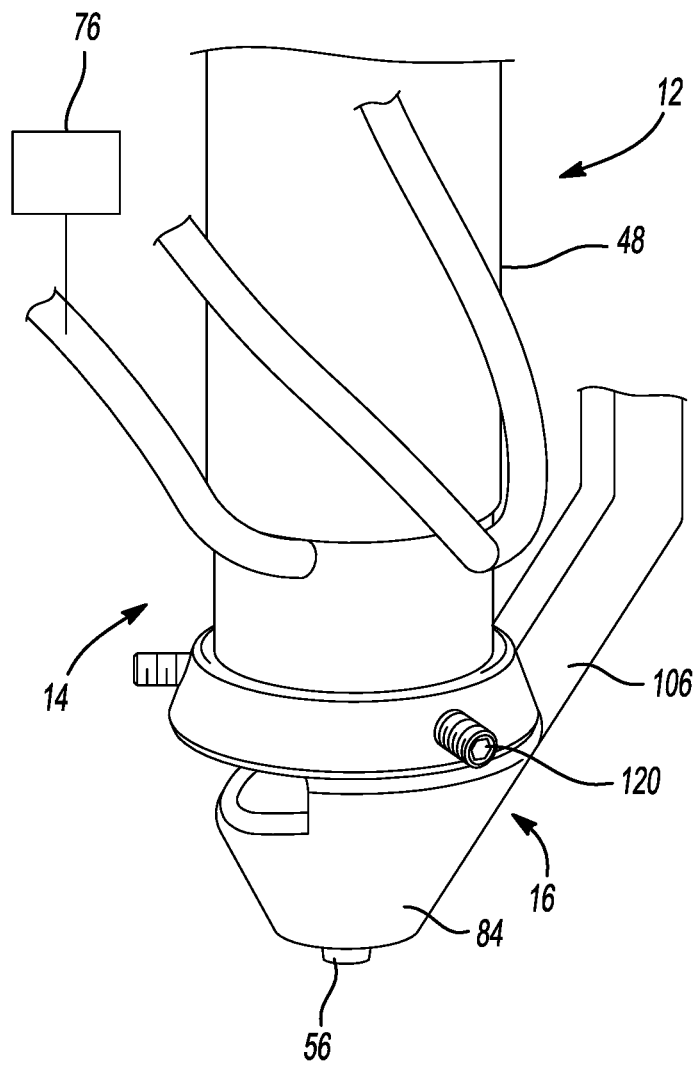
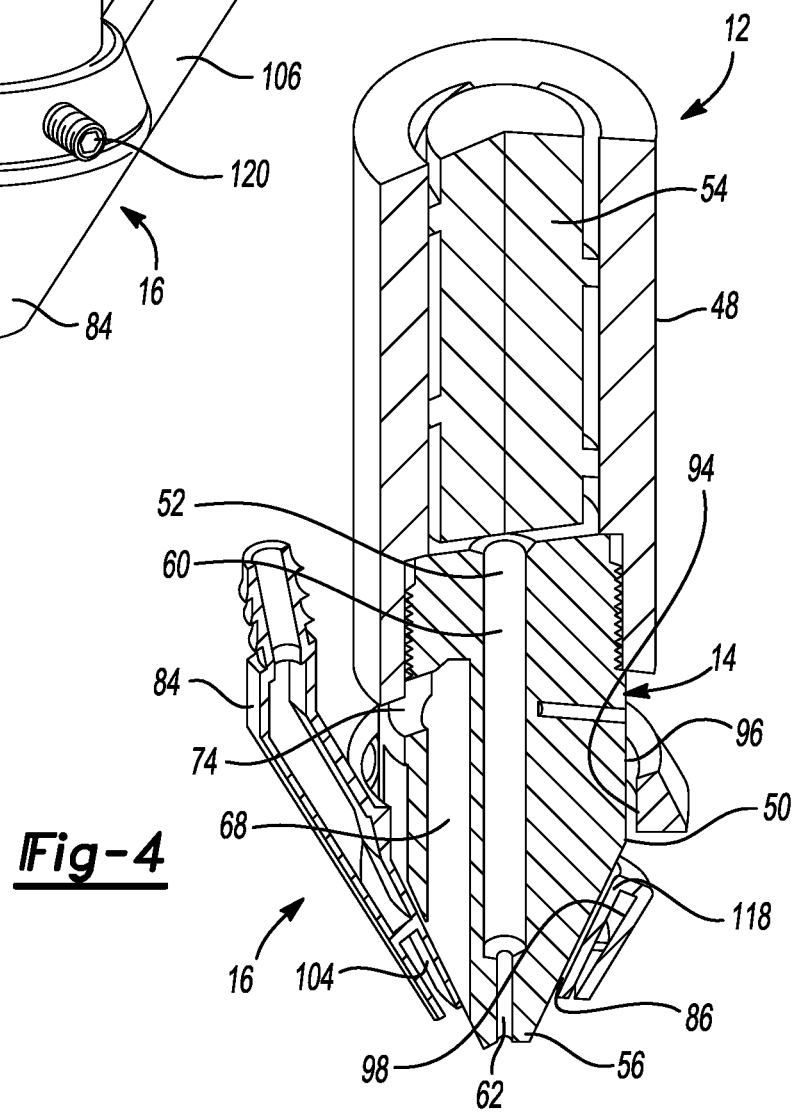
Fig-3
Fig-4

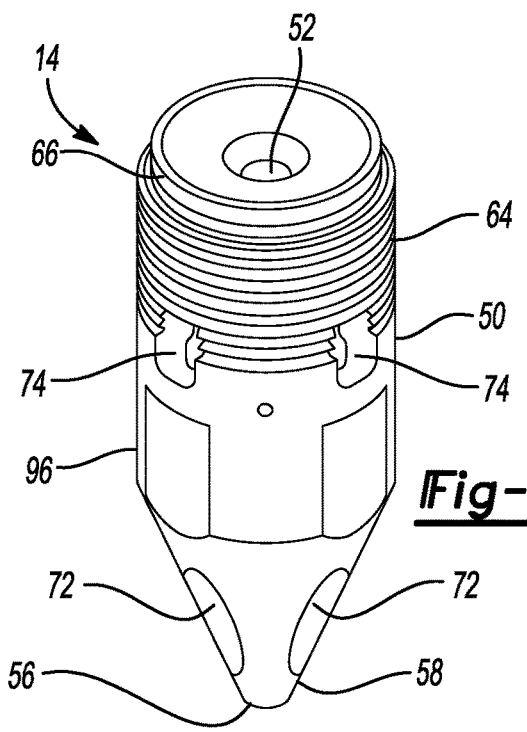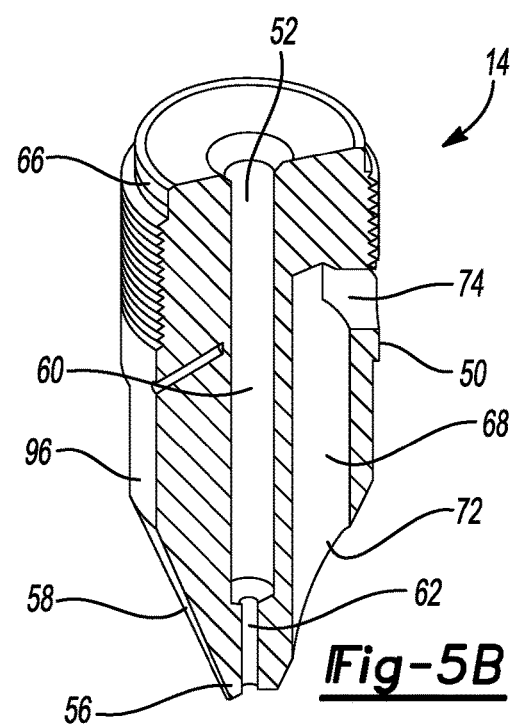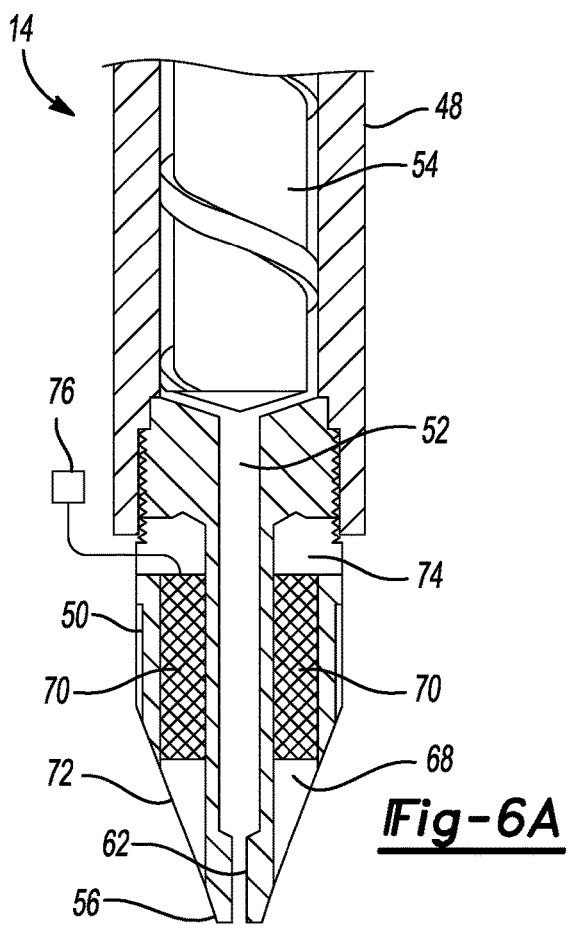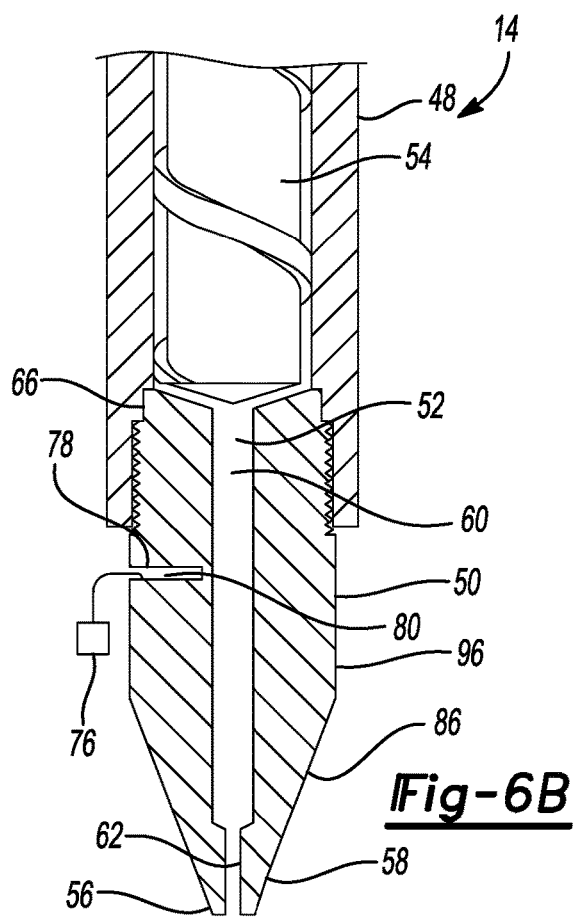

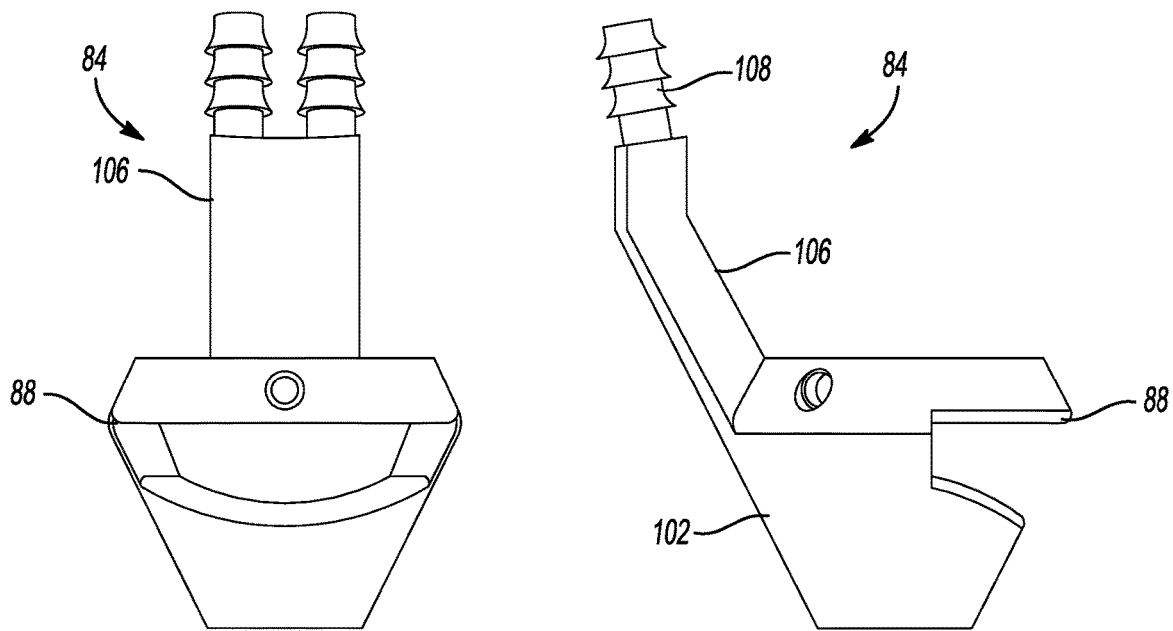
*Fig-7A*  *Fig-7B*
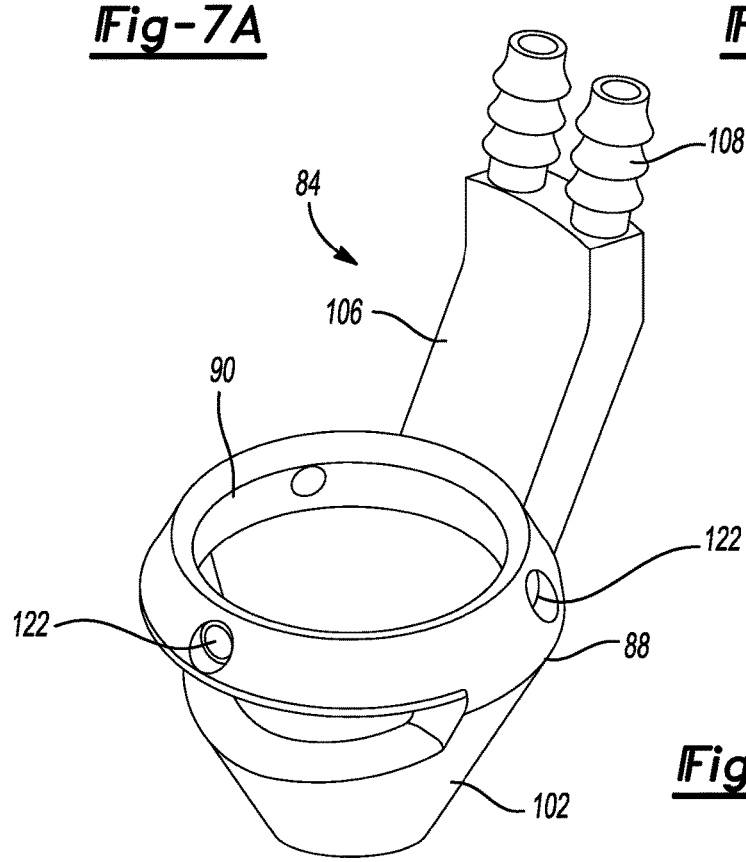
*Fig-8*

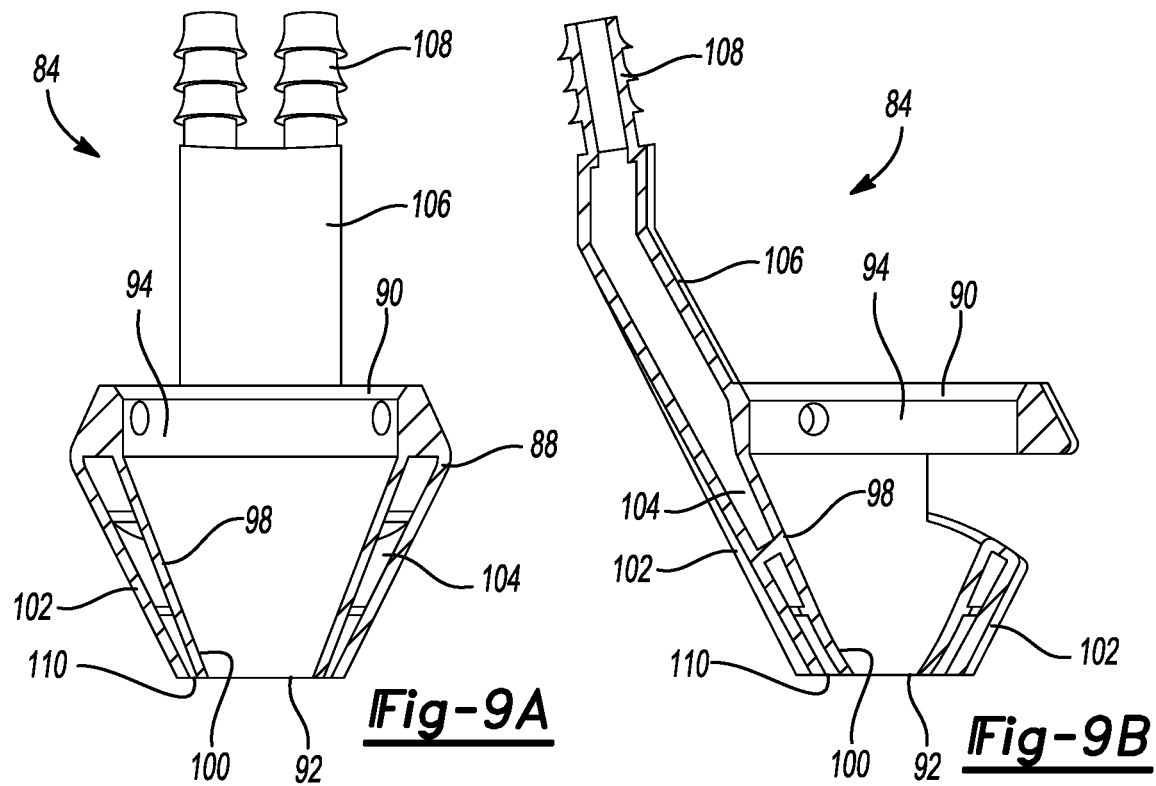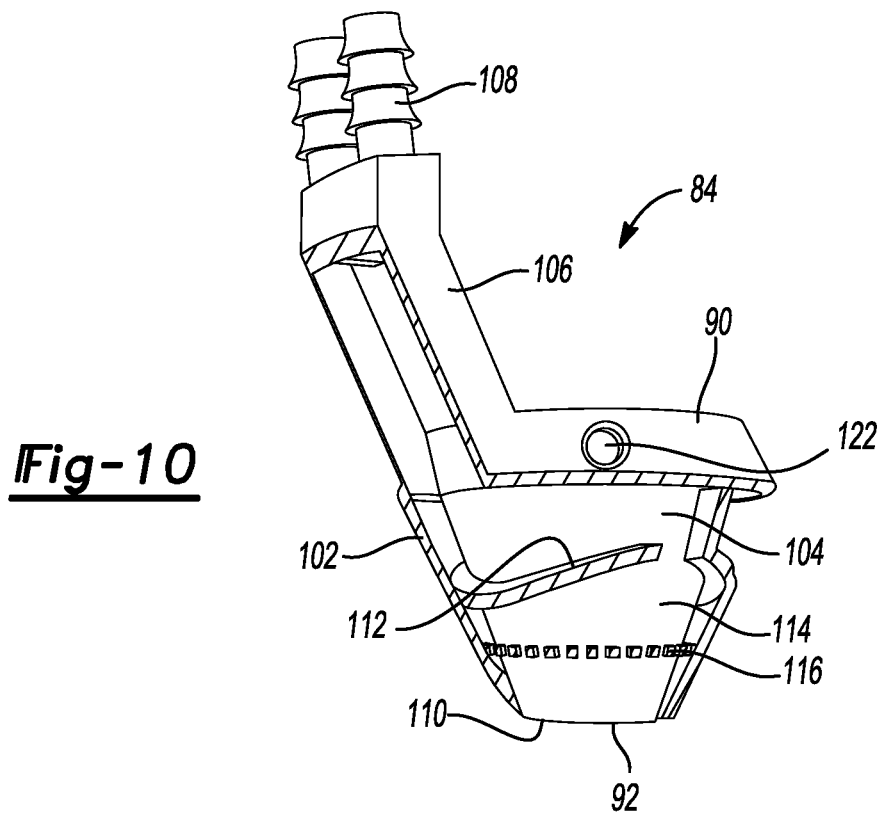

EXTRUSION DIE AND NOZZLE COOLING SYSTEM FOR LARGE SCALE 3D ADDITIVE MANUFACTURING

CROSS-REFERENCE TO RELATED APPLICATIONS

This application claims the benefit of U.S. Provisional Application No. 62/411,844, filed on Oct. 24, 2016 and U.S. Provisional Application No. 62/411,932, filed on Oct. 24, 2016. The entire disclosure of each of the above applications is incorporated herein by reference.

FIELD

The present disclosure relates to extrusion dies for use in large scale additive manufacturing (AM) and, more particularly, relates to extrusion dies and nozzle cooling systems for use in large scale additive manufacturing of thermoplastics and thermoplastic elastomers.

BACKGROUND AND SUMMARY

This section provides background information related to the present disclosure which is not necessarily prior art. This section also provides a general summary of the disclosure, and is not a comprehensive disclosure of its full scope or all of its features.

As is known, Additive Manufacturing (AM) includes technologies that build 3D objects by adding layer-upon-layer of material, whether the material is plastic, metal, or concrete. Common to AM technologies is the use of a computer, 3D modeling software (Computer Aided Design or CAD), machine equipment, and layering material. Once a CAD sketch is produced, the AM equipment reads in data from the CAD file and lays downs or adds successive layers of liquid, powder, sheet material, or other material in a layer-upon-layer fashion, such as through extrusion, to fabricate a 3D object.

The term AM encompasses many technologies including subsets like 3D Printing, Rapid Prototyping (RP), Direct Digital Manufacturing (DDM), layered manufacturing, and additive fabrication.

AM application is limitless. Early use of AM in the form of Rapid Prototyping focused on preproduction visualization models. More recently, AM is being used to fabricate end-use products in aircraft, dental restorations, medical implants, automobiles, and even fashion products.

According to the principles of the present teachings, a compact extrusion die is provided with integrated breaker plate and tightly controlled thermal characteristics, enabling the predictable extrusion of thermoplastic and thermoplastic matrix composites in additive manufacturing (AM) applications, including layer based and non-layer based methodologies. Additional variations include the usage of an annular die (tube based) for increased bending stiffness of the extruded profile.

In some embodiments, the compact extrusion die can comprise a compact, cooling attachment or system that provides an even, focused flow of refrigerated cooling air at a precise location at the exit of the extrusion die. This cooling air serves to allow accelerated build rates in layer-based AM as well as controlled solidification for non-layer based (3D) AM.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1A illustrates a tensile net boundary;

FIG. 1B illustrates a tensile net computation;

FIG. 1C illustrates a tensile net design;

FIG. 1D illustrates a tensile net layout;

FIG. 1E is a view illustrating an Additive Manufacturing (AM) system providing a layer-by-layer design according to the principles of the present teachings;

FIG. 3 is a perspective view illustrating an extrusion die nozzle for use in AM according to the principles of the present teachings;

FIG. 4 is a cross-sectional view illustrating the extrusion die nozzle and nozzle cooling system according to the principles of the present teachings;

FIG. 5A is a perspective view illustrating the extrusion die nozzle according to the principles of the present teachings;

FIG. 5B is a partial cross-sectional view illustrating the extrusion die nozzle according to the principles of the present teachings;

FIG. 6A is a cross-sectional view taken along Line 6A-6A of FIG. 5A illustrating the extrusion die nozzle according to the principles of the present teachings;

FIG. 6B is a cross-sectional view taken along Line 6B-6B of FIG. 5A illustrating the extrusion die nozzle according to the principles of the present teachings;

FIG. 7A is a front view of the nozzle cooling system according to the principles of the present teachings;

FIG. 7B is a side view of the nozzle cooling system according to the principles of the present teachings;

FIG. 8 is a perspective view of the nozzle cooling system according to the principles of the present teachings;

FIG. 9A is a front cross-sectional view of the nozzle cooling system according to the principles of the present teachings;

FIG. 9B is a side cross-sectional view of the nozzle cooling system according to the principles of the present teachings; and FIG. 10 is a side cross-sectional view of the nozzle cooling system according to the principles of the present teachings having a back surface removed to reveal internal pathway contours.

Corresponding reference numerals indicate corresponding parts throughout the several views of the drawings.

DETAILED DESCRIPTION

Figure 2:
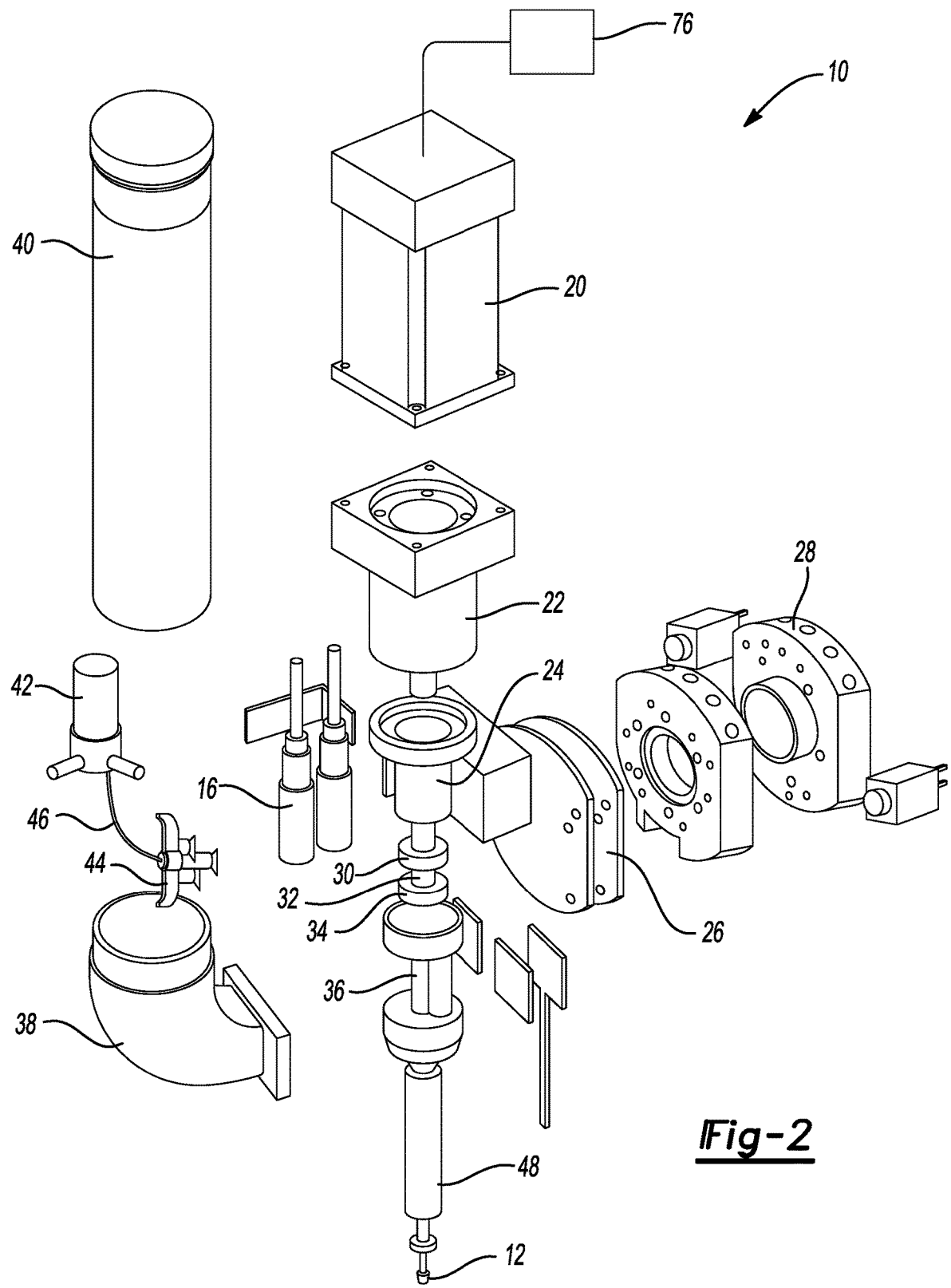
FIG. 2 is an exploded perspective view illustrating an AM system according to the principles of the present teachings.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

According to the principles of the present teachings, an additive manufacturing (AM) system 10 is provided having advantageous construction and method of use. In particular, AM system 10 comprises an AM nozzle system 12 having an AM extrusion die 14 and an AM cooling system 16, which will be described in detail herein and illustrated in the accompanying figures.

AM system 10 is an improved design of an extrusion die targeted at large scale additive manufacturing of thermoplastics (filled or unfilled) and thermoplastic elastomers. The design comprises a compact extrusion die with integrated breaker plate, with tightly controlled thermal characteristics, enabling the predictable extrusion of thermoplastic and thermoplastic matrix composites in additive manufacturing (AM) applications, including layer based and non-layer based methodologies. Additional variations include the usage of an annular die (tube based) for increased bending stiffness of the extruded profile.

In contrast with typical extrusion processes, AM processes require dynamic control of die temperature in order to respond to fluctuations in extrusion rate. Especially in non-layer based approaches, or hybrid approaches which include free-spanning and layer based sections, the extrusion rate can vary dramatically. The improved design of the present teachings integrates heating and temperature control into the die in such a way that it can rapidly respond to process changes. It also brings the potential of utilizing temperature as a controllable parameter to modify the behavior and bonding properties of the extruded bead.

Existing die designs at the scale of a 1" bore pellet extruder typically use a solid plug shaped die, which is heated via conduction from the heated barrel. This typically results in a significant thermal gradient from the hot end of the barrel to the exit point of the die. This gradient is made worse as the nozzle length is extended in order to provide better approach angles for non-layer based, 3D, and/or extrusion at varying angles of attach to the substrate. Additionally, external forced cooling, often used to improve printing speeds can further amplify this gradient. In order to compensate, melt zone temps must be increased, and this can degrade the material properties in conventional applications.

The present teachings closely integrate closed loop controlled heating within the extrusion die, in order to mitigate all of these effects. Further, the response time of the heating is such that the extrudate temperature can be controlled real time (e.g. on the fly). For instance, in printing a spanning member, temperatures can be reduced to maximize cooling rate, while for bonding layers, as in typical layer based 3D printing, it can be increased. The envelope of the nozzle is designed to enable the attachment of a compact annular cooling system, while minimizing constraints on the approach angles between the nozzle and the printing substrate.

As discussed and illustrated in connection with FIGS. 1A-1E, AM with thermoplastic and thermoplastic matrix composites has unique requirements relative to traditional continuous profile extrusion applications. A tightly coupled control between process related variables and motion control is essential for high quality part production. In addition, task specific offline control software is required to control these parameters synchronously with the motion control platform. This system can be applied with a minimum of 4 controlled axes, with 7-12 controlled axes in larger scale applications. The most critical element is synchronous control of the extrusion motor, to allow for precise start/restart of the extruded bead. Advanced applications involve customized offline programming tools which have been developed to allow precise variation of bead properties based on geometric inputs, and to allow AM approaches which go beyond vertical layer based approaches.

With particular reference to FIG. 2, in some embodiments, AM system 10 comprises a servo motor system 20 operably coupled to a gearhead 22 actuating AM system 10 to output a material to be extruded for additive manufacturing. In some embodiments, the material comprises thermoplastics (filled or unfilled) and thermoplastic elastomers. A housing member 24 can be operably coupled to gearhead 22 via adapter plates 26 and robotic connection 28. Housing 24 can be coupled to radial bearing 30, shaft 32, and thrust bearing 34 in a conventional manner. A feed housing 36 can be operably coupled to a hopper 38 of a material system having a hopper tube 40, auger motor 42 coupled to an auger propeller 44 via a drive shaft 46. AM system 10 routes material from feed housing 36 to barrel 48 and then to extrusion die 14.

With reference to FIGS. 3-6B, in some embodiments, extrusion die 14 of nozzle system 12 can comprise a generally cylindrical die housing 50 having an internal central extruder channel 52 disposed along an axial center line of housing 50. Central extruder channel 52 is sized to receive material from a feed screw 54 operably disposed within barrel 48 for advancing material toward an extruder tip 56 on a distal end 58 of die housing 50. Central extruder channel 52 can comprise a first section 60 being enlarged relative to a second section 62, generally referred to as a die land. A neck portion 61 can be disposed between first section 60 and second section 62. Die housing 50 can comprise a threaded portion 64 on a proximal end 66 threadedly coupled to complementary threads formed on barrel 48 (see FIGS. 6A-6B).

With continued reference to FIGS. 3-6B, in some embodiments, extrusion die 14 further comprises one or more cartridge heater slots 68 disposed in die housing 50 for receiving a cartridge heater 70 (FIG. 6A). In some embodiments, cartridge heater slots 68 can be radially disposed about the axial center line of housing 50 and parallel thereto to impart a thermal energy to material within central extruder channel 52. Although any one of a number of cartridge heaters can be used, in some embodiments, three cartridge heaters 70 are disposed in a corresponding number of cartridge heater slots 68 disposed at 120 degree intervals about housing 50. Cartridge heater slots 68 can be configured to have an exposed open end 72 for receiving cartridge heater 70 therein.

Extrusion die 14 can further comprise wire inlet ports 74 extending through a sidewall surface of die housing 50. Wire inlet ports 74 are in communication with cartridge heater slots 68 to permit electrical coupling of cartridge heaters 70 to a controller 76 for precise temperature control thereof. In some embodiments, a thermocouple port 78 extends through the sidewall surface of die housing 50 to permit insertion of a thermocouple 80 (FIG. 6B) in order to provide thermal sensing of die housing 50, extruder channel 52, and/or the extrusion material during operation. Thermocouple 80 can output a thermocouple signal to controller 76 that can be used to determine an output control signal for controlling cartridge heaters 70 and/or AM cooling system 16.

In some embodiments, as illustrated in FIGS. 3, 4, and 7A-10, AM system 10 further comprises AM cooling system 16. AM cooling system 16 is a specialized nozzle cooling attachment to increase production rates in extrusion based AM applications. In some embodiments, AM cooling system 16 comprises a compact, cooling attachment for extrusion die 14 which provides an even, focused flow of a refrigerated coolant (gaseous phase), such as any gaseous medium, including air or nitrogen, at a precise location at the distal end 58 of extrusion die 14 in response to a control system from controller 76. This cooling process serves to allow accelerated build rates in layer based AM as well as controlled solidification for non-layer based (3D) AM. The system is designed to minimize the envelope and/or spacing requirements around the extrusion die 14 to minimize the overall size of the AM system 10. This is especially important in non-layer based approaches which involve branching structures, and extrusion at non-orthogonal tool angles.

Existing designs often make use of radially spaced air jets which are directed generally at the die exit point. While flexible in their placement, the air jets often limit the accessibility of the extrusion nozzle to the part due to the overall size of the system. Typically the nozzle also requires additional insulation to prevent unwanted cooling effects, which further interferes with access to the part. The present AM cooling system 16 is tapered to fit extrusion die 14 very closely, providing a consistent, 360° flow of cooling medium. The cross-section is shaped similar to an "airknife" in section, in order to precisely impinge on the extruded material at tip 56 of extrusion die 14, while maintaining an insulating gap (to be discussed) between the inner wall of the cooling nozzle and the outer surface of extrusion die 14. The cooling nozzle is precisely positioned on extrusion die 14 using adjustment screws and rigid standoffs.

More particularly, in some embodiments, AM cooling system 16 comprises a cooling sleeve 84 sized and shaped to generally surround a tapered tip section 86 of extrusion die 14 (see FIG. 4). Cooling sleeve 84 can comprise a generally conical main body section 88 having a first enlarged open end 90 and an opposing second narrow open end 92. In some embodiments, first enlarged open end 90 can be configured to include both a generally cylindrical internal wall section 94 sized to generally surround a cylindrical portion 96 of extrusion die 14 and a generally tapered internal wall section 98 sized to generally surround tapered tip section 86 of extrusion die 14. Tapered internal wall section 98 can smoothly transition to a corresponding tapered internal tip wall section 100 adjacent second narrow open end 92. A generally correspondingly shaped external wall section 102 can generally surround internal wall sections 94, 98, 100 to define a distribution chamber 104 therebetween within a defined volume.

In some embodiments, cooling sleeve 84 comprises one or more input ports 106 extending from main body section 88. Input ports 106 can comprise coupling members 108 for coupling with a cooling line for delivering coolant to distribution chamber 104. In some embodiments, distribution chamber 104 can receive coolant from input ports 106 and distribute the coolant to one or more exit ports 110. In some embodiments, exit port 110 is a single continuous exit port surrounding distal end 58 of extruder tip 56 to provide a continuous and uniform cooling pattern. To this end, distribution chamber 104 can comprise one or more baffles 112 and/or focus chambers 114 to ensure distribution of coolant. This ensures that cooling is uniform about extruder tip 56. A first baffle 112 can extend along a back wall of cooling sleeve 84 to ensure that coolant introduced into input ports 106 is obstructed and routed about distribution chamber 104. In some embodiments, first baffle 112 is arcuately shaped to facilitate flow of coolant. In some embodiments, distribution chamber 104 can further comprise a diffuser 116 downstream of first baffle 112 and generally adjacent second narrow open end 92 to diffuse coolant and provide a uniform flow from second narrow open end 92.

It should be noted that, in some embodiments, an insulating gap 118 (FIG. 4) is defined between internal wall sections 94, 98, 100 of cooling sleeve 84 and exterior wall of extrusion die 14. This insulating gap 118 further facilitate careful thermal control of the medium and ensures that cooling occurs substantially at the extruder tip 56 in a uniform manner. Precise fastening members 120, such as screws and the like, can be radially disposed about cooling sleeve 84 via fastening apertures 122 to ensure proper gap 118 and reliable coupling of cooling sleeve 84 to extrusion die 14.

AM applications require additional parameters of control when compared with traditional, subtractive machining processes. In order to compensate for nonlinearities in extrusion rate, as well as delays due to material behaviors, an integrated approach to offline programming which compensates for these factors in a geometrically sensitive manner has been developed. By allowing these process parameters to respond to the designed geometry of the part, AM can be extended to components which have large overhangs, and/or spanning elements. This offline programming system has been tailored to work with standard industrial PLC systems as well as typical robotic and CNC controllers. Additional usages include integration with closed loop sensing systems which adapt the toolpath during production.

The present teachings provide a number of advantages over the prior art, including, but not limited to, tightly controlled temperature range to assist in producing predictable melt viscosity, extrudate diameter, and substrate fusion and a compact cooling sleeve allows for advanced, non-layer based approaches to AM at highly oblique angles, minimizing collisions with part.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An additive manufacturing (AM) extrusion die system comprising:
    an extrusion die configured to receive a material to be extruded, the extrusion die having:
       a main body having a cylindrical section and a distal tapered section terminating at an extruder tip, the main body being configured to mount to a barrel of an additive manufacturing system;
       a central extruder channel extending axially along the main body, the central extruder channel configured to receive the material at the cylindrical section of the main body and output the material at the extruder tip of the main body; and
       a cartridge heater slot formed within the main body and generally parallel to the central extruder channel, the cartridge heater slot configured to receive a cartridge heater therein for imparting thermal energy to the material within the central extruder channel; and
    an AM cooling system coupled to the extrusion die, the AM cooling system configured to actively thermally regulate a coolant medium at or near the extruder tip, the AM cooling system having a cooling sleeve having a main body surrounding the main body of the extrusion die, the cooling sleeve having an internal wall section and an external wall section forming a distribution chamber therebetween, the internal wall section of the cooling sleeve having a cylindrical section and a tapered section substantially conforming to the extrusion die, the cooling sleeve having an input port and an exit port in fluid communication with the distribution chamber, the distribution chamber being configured to receive the coolant medium from the input port and distribute the coolant medium to the exit port.

2. The additive manufacturing (AM) extrusion die system according to claim 1, wherein the distribution chamber comprises a baffle to route the coolant medium throughout the distribution chamber.

3. The additive manufacturing (AM) extrusion die system according to claim 2, wherein the baffle is arcuately shaped.

4. The additive manufacturing (AM) extrusion die system according to claim 1, wherein the distribution chamber comprises a diffuser adjacent the exit port to ensure uniform flow of the coolant medium at the exit port.

5. The additive manufacturing (AM) extrusion die system according to claim 1, wherein the cooling sleeve is sized to define an insulating gap formed between the main body of the cooling sleeve and the main body of the extrusion die.

6. The additive manufacturing (AM) extrusion die system according to claim 5, wherein the cooling sleeve is coupled to the extrusion die using a plurality of fasteners to ensure the insulating gap is maintained therebetween.

7. The additive manufacturing (AM) extrusion die system according to claim 1 further comprising a thermocouple port formed in the main body, the thermocouple port configured to receive a thermocouple therein for measuring a temperature of at least one of the main body and the material.

8. The additive manufacturing (AM) system according to claim 1 wherein the cartridge heater slot is formed within the main body having an open distal end.

9. An additive manufacturing (AM) system comprising:
    a barrel member;
    a hopper system configured to contain a material to be extruded;
    a drive system configured to transport the material from the hopper system to the barrel member;
    an extrusion die configured to receive the material to be extruded, the extrusion die having:
       a main body having a cylindrical section and a distal tapered section terminating at an extruder tip, the main body being mounted to the barrel;
       a central extruder channel extending axially along the main body, the central extruder channel configured to receive the material from the drive system and output the material at the extruder tip of the main body; and
       a cartridge heater slot formed within the main body and generally parallel to the central extruder channel, the cartridge heater slot configured to receive a cartridge heater therein for imparting thermal energy to the material within the central extruder channel; and
    an AM cooling system coupled to the extrusion die, the AM cooling system configured to actively thermally regulate a coolant medium at or near the extruder tip of the main body of the extrusion die, the AM cooling system having an internal wall section having a cylindrical section and a tapered section substantially conforming to corresponding sections of the extrusion die.

10. The additive manufacturing (AM) system according to claim 9, wherein the AM cooling system comprises a cooling sleeve having a main body surrounding the main body of the extrusion die.

11. The additive manufacturing (AM) system according to claim 10, wherein the cooling sleeve comprises an internal wall section and an external wall section forming a distribution chamber therebetween, the cooling sleeve having an input port and an exit port in fluid communication with the distribution chamber, the distribution chamber being configured to receive the coolant medium from the input port and distribute the coolant medium to the exit port.

12. The additive manufacturing (AM) system according to claim 11, wherein the distribution chamber comprises a baffle to route the coolant medium throughout the distribution chamber.

13. The additive manufacturing (AM) system according to claim 12, wherein the baffle is arcuately shaped.

14. The additive manufacturing (AM) system according to claim 11, wherein the distribution chamber comprises a diffuser generally adjacent the exit port to ensure uniform flow of the coolant medium at the exit port.

15. The additive manufacturing (AM) system according to claim 11, wherein the cooling sleeve is sized to define an insulating gap formed between the main body of the cooling sleeve and the main body of the extrusion die.

16. The additive manufacturing (AM) system according to claim 15, wherein the cooling sleeve is coupled to the extrusion die using a plurality of fasteners to ensure the insulating gap is maintained therebetween.

17. The additive manufacturing (AM) system according to claim 9 further comprising a thermocouple port formed in the main body, the thermocouple port configured to receive a thermocouple therein for measuring a temperature of at least one of the main body and the material.

18. The additive manufacturing (AM) system according to claim 9 wherein the cartridge heater slot is formed within the main body having an open distal end.

* * * * *

UNITED STATES PATENT AND TRADEMARK OFFICE
CERTIFICATE OF CORRECTION

PATENT NO. : 10,807,292 B2
APPLICATION NO. : 15/792286
DATED : October 20, 2020
INVENTOR(S) : Jonathan Wesley McGee et al.

Page 1 of 1

It is certified that error appears in the above-identified patent and that said Letters Patent is hereby corrected as shown below:

In the Claims

At Column 8, Claim 8, Line number 21, before "system", insert --extrusion die--.

Signed and Sealed this
Fifteenth Day of December, 2020

Andrei Iancu
*Director of the United States Patent and Trademark Office*